United States Patent [19]

Noguchi et al.

[11] Patent Number: 4,928,385
[45] Date of Patent: May 29, 1990

[54] AUTOMOTIVE DOOR HANDLE ASSEMBLING ROBOT

[75] Inventors: Hiroyuki Noguchi; Ichiho Yamada, both of Marysville, Ohio

[73] Assignee: Honda Giken Kogyo, Tokyo, Japan

[21] Appl. No.: 333,907

[22] Filed: Apr. 6, 1989

[51] Int. Cl.$^5$ .............................................. B23P 21/00
[52] U.S. Cl. ..................................... 29/788; 29/281.5; 29/787; 901/36
[58] Field of Search ....................... 29/283, 281.5, 563, 29/568, 787, 788, 789, 790, 774; 49/502; 53/447; 279/1 A, 1 D, 1 DA, 1 ME, 2 R; 296/39.1, 152; 414/331, 751; 901/36

[56] References Cited

U.S. PATENT DOCUMENTS

| | | | |
|---|---|---|---|
| 3,713,691 | 1/1973 | Bayless | 49/502 X |
| 4,679,297 | 7/1987 | Hansen, Jr. et al. | 29/568 |
| 4,715,110 | 12/1987 | St. Angelo et al. | 901/36 X |
| 4,777,783 | 10/1988 | Zald | 53/447 |
| 4,827,671 | 5/1989 | Herringshaw et al. | 49/502 X |

Primary Examiner—Timothy V. Eley
Assistant Examiner—Peter D. B. Vo

[57] ABSTRACT

An apparatus for assembling a door handle operates by installing a key guard assembly in the door handle in automatically assembling the door handle assembly to be mounted on the outer surface of an automotive door panel. The apparatus includes a first feed device for feeding components of the key guard assembly supplied from a parts feeder, a superposing device for superposing the components of the key guard assembly supplied by the first feed device, into a key guard assembly, an industrial robot for installing the key guard assembly in a door handle, and a second feed device for delivering the key board assembly to the industrial robot. The industrial robot includes a chuck device for dripping the key guard assembly and installing the key guard assembly in the door handle, and an end effector having a staking device for bending tongues of the key guard assembly to fix the key guard assembly to the door handle.

9 Claims, 12 Drawing Sheets

AUTOMOTIVE DOOR HANDLE ASSEMBLING ROBOT

BACKGROUND OF THE INVENTION

The present invention relates to an apparatus for assembling a door handle, and more particularly to an assembling apparatus in a production system for automatically assembling a door handle to be attached to the outer surface of an automotive door panel, and particularly a door handle assembling apparatus for highly efficiently installing an assembly composed of small parts such as a key guard assembly on a door handle.

When getting into an automobile, a door of the automobile is opened by gripping a door handle installed on the outer surface of the panel of the door. One known door handle for use on an automobile door is illustrated in FIGS. 1 and 2 of the accompanying drawings. FIG. 1 shows the various components of a door handle assembly 2, and FIG. 2 illustrates the door handle assembly 2 as it is completed.

The door handle assembly 2 basically comprises a handle case 4 and a handle 6, and also includes various other accessory parts. The handle 6 is angularly movably coupled to the handle case 4 by means of hinge pins 8a, 8b. More specifically, the handle 6 includes a hinge lever 10a connected to support arms 12a, 12b of the handle case 4 by the hinge pin 8a, and another hinge lever 10b connected to support arms 12c, 12d of the handle base 4 by the hinge pin 8b. Torsion coil springs 14a, 14b coact respectively between the support arm 12b and the hinge lever 10a and between the support arm 12c and the hinge lever 10b for normally holding the handle 6 against the handle case 4 when the handle 6 is assembled in the handle case 4. Stoppers 16 of rubber are mounted in the handle case 4 for preventing the handle 6 from directly hitting the handle case 4 to protect the handle case 4.

The handle case 4 has an integral protective member 18 projecting inwardly from the inner surface of a corner of the handle case 4. The protective member 18 serves to surround a lock in a door to protect the same when the door handle assembly 2 is installed on the door. A key guard assembly 20 is mounted in the protective member 18. The key guard assembly 20 comprises an annular gasket 22 and a gasket cap 24 by which the gasket 22 is fixed to the outer end of the protective member 18 and protected from damage. For attaching the key guard assembly 20, the gasket cap 24 and the gasket 22 are axially combined together into the key guard assembly 20, and then tongues 28a, 28b on the gasket cap 24 are inserted respectively into grooves 26a, 26b defined in the handle case 4 and bent over by staking into firm engagement with the handle case 4.

A case gasket 30 is interposed between the handle case 4 and a door panel 31 to provide a seal therebetween. The handle case 4 has a plurality of protrusions 32 on an outer peripheral flange thereof which are inserted into respective holes defined in the case gasket 30 and subsequently deformed by staking to hold the case gasket 30 in position. A bushing 34 is inserted in the hinge lever 10a and coupled to the mechanism of the lock in the door.

As described above, the door handle assembly 2 is comprised of the handle case 4, the handle 6, the hinge pins 8a, 8b, the coil springs 14a, 14b, and other small components. The door handle assembly 2 has been assembled only manually by workers through a complex process of various assembling steps.

For putting the key guard assembly 20 into the handle case 4, for example, three assembling steps are required: First, the gasket 22 and the gasket cap 24 are combined into the key guard assembly 20. Then, the tongues 28a, 28b on the gasket cap 24 are inserted respectively into the grooves 26a, 26b in the handle case 4. Finally, the tongues 28a, 28b are bent radially inwardly by a staking tool to fasten the key guard assembly 20 to the handle case 4.

Since the door handle assembly 2 itself is very small and its components are smaller and cannot be handled with ease, its assembling process does not lend itself to an automatic process employing an industrial robot. It has been customary to assemble the door handle assembly manually by as many workers as required with jigs and tools designed for use in the various assembling steps.

The manual assembling process is disadvantageous in that the assembling capability is limited and the efficiency depends on the skill of the worker who assembles the components. If the efficiency is to be increased according to the present manual method, the cost of skillful manual labor will also be increased, and so will the cost of manufacture, because today the personal expenses have a large share in the overall cost. Therefore, there is a strong demand in the art for a fully automatized process for assembling door handles.

SUMMARY OF THE INVENTION

It is a general object of the present invention to provide a door handle assembling apparatus capable of fully automatically installing a subassembly such as a key guard composed of several small parts into a door handle assembly without manual intervention in substantially one process for higher assembling efficiency.

Another object of the present invention is to provide an apparatus for assembling a door handle by installing a key guard assembly in the door handle in automatically assembling the door handle assembly to be mounted on the outer surface of an automotive door panel, said apparatus comprising: first feed means for feeding components of the key guard assembly supplied from a parts feeder; superposing means for superposing the components of the key guard assembly supplied by said first feed means, into a key guard assembly; an industrial robot for installing the key guard assembly in a door handle; second feed means for delivering the key guard assembly to said industrial robot; wherein the industrial robot comprising chuck means for gripping said key guard assembly and installing the key guard assembly in the door handle, and an end effector is provided having staking means for bending tongues of said key guard assembly to fix the key guard assembly to the door handle.

Still another object of the present invention is to provide an apparatus for assembling the door handle, wherein said superposing means includes a horizontal beam supporting rails, a first support member movably engaging said rails and horizontally movable along said rails by a cylinder, a second support member vertically movably engaging said first support member and movable by a cylinder, and a superposing mechanism disposed on said second support member for holding the first and second components of the key guard assembly in concentric relation to each other and for assembling said first and second components together.

Yet another object of the present invention is to provide an apparatus for assembling the door handle, wherein said superposing mechanism comprises a body vertically movably engaging said second support member, a cylindrical member loosely fitted in said body, a first collet chuck mounted on a lower end of said cylindrical member, and a second collet chuck mounted on a lower end of said body in concentrically surrounding relation to said first collet chuck, the arrangement being such that the first collect chuck while holding the first component is retracted into said second collet chuck, then the second component is held by said second collet chuck, and thereafter said first collet chuck is projected from said second collet chuck to superpose said first component on said second component held by said second collet chuck.

Yet still another object of the present invention is to provide an apparatus for assembling the door handle, further including a first cylinder coupled to said body for vertically moving said body, a second cylinder coupled to said cylindrical member for axially moving said cylindrical relatively to said body, and a cam rod mounted on said second collet chuck and slidable along an outer tapered surface of said cylindrical member to open and close said second collet chuck when said cylindrical member and said body are relatively moved in response to operation of said first and second cylinders.

A further object of the present invention is to provide an apparatus for assembling the door handle, further including a third cylinder having a rod extending therefrom and inserted coaxially through said cylindrical member, and a widening member connected to a distal end of said rod of the third cylinder and slidably engaging an inner tapered surface of said first collet chuck for opening and closing said first collet chuck.

A still further object of the present invention is to provide an apparatus for assembling the door handle, wherein said industrial robot further includes an end effector, said chuck means and said staking means being disposed on said end effector in confronting relation to each other.

A yet further object of the present invention is to provide an apparatus for assembling the door handle, wherein said chuck means comprises a pair of levers angularly movable toward and away from each other and normally urged to move toward each other by a resilient member, a cylinder having a piston rod, and a pusher member mounted on said piston rod and having a tapered distal end portion, the arrangement being such that when said cylinder is actuated, said pusher member can be inserted between rear ends of said levers to turn said levers away from each other for holding the key guard assembly.

A yet still further object of the present invention is to provide an apparatus for assembling the door handle, wherein said staking means includes a cylinder having a piston rod, and a staking tool mounted on a distal end of said piston rod for bending tongues of the key guard assembly.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
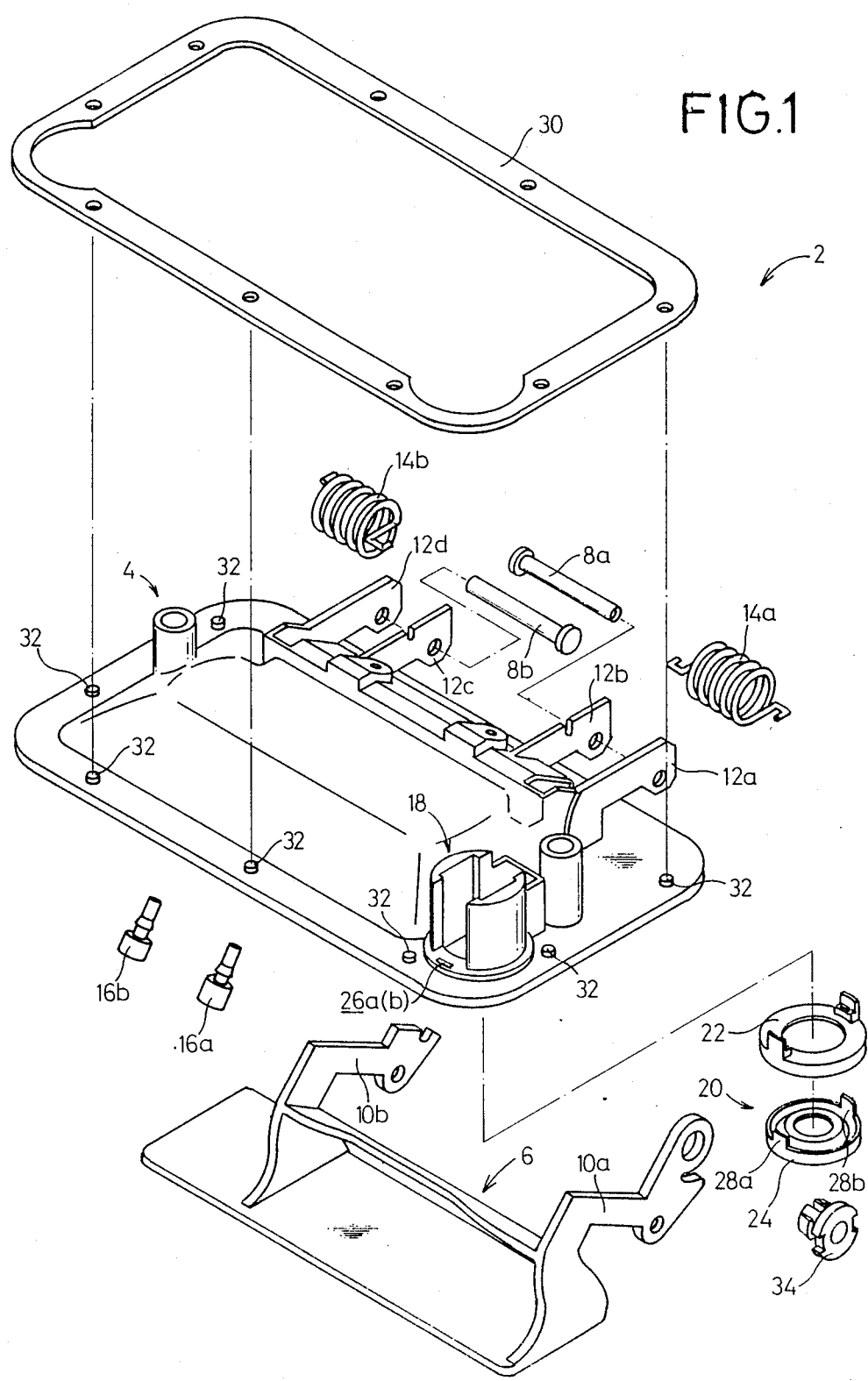
FIG. 1 is an exploded perspective view of a door handle into which a key guard is incorporated by employing a door handle assembling apparatus according to the present invention.
Figure 2:
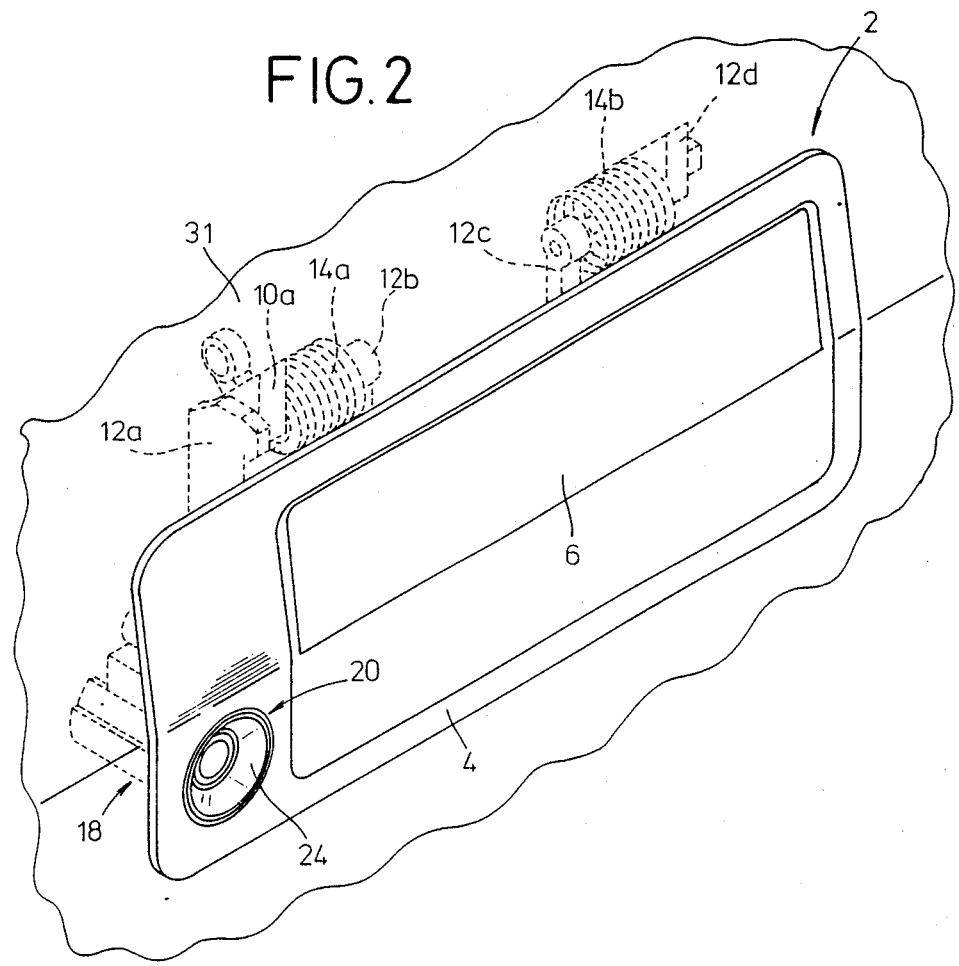
FIG. 2 is a perspective view of the completed door handle mounted on a door panel.

Prior to describing a door handle assembling apparatus according to the present invention, a pallet for feeding a workpiece to an assembling station will first be described below. The workpiece herein referred to is identical to the door handle assembly 2 shown in FIGS. 1 and 2, and the workpiece components are denoted by identical reference numerals employed in FIGS. 1 and 2, and will not be described in detail.

Figure 3:
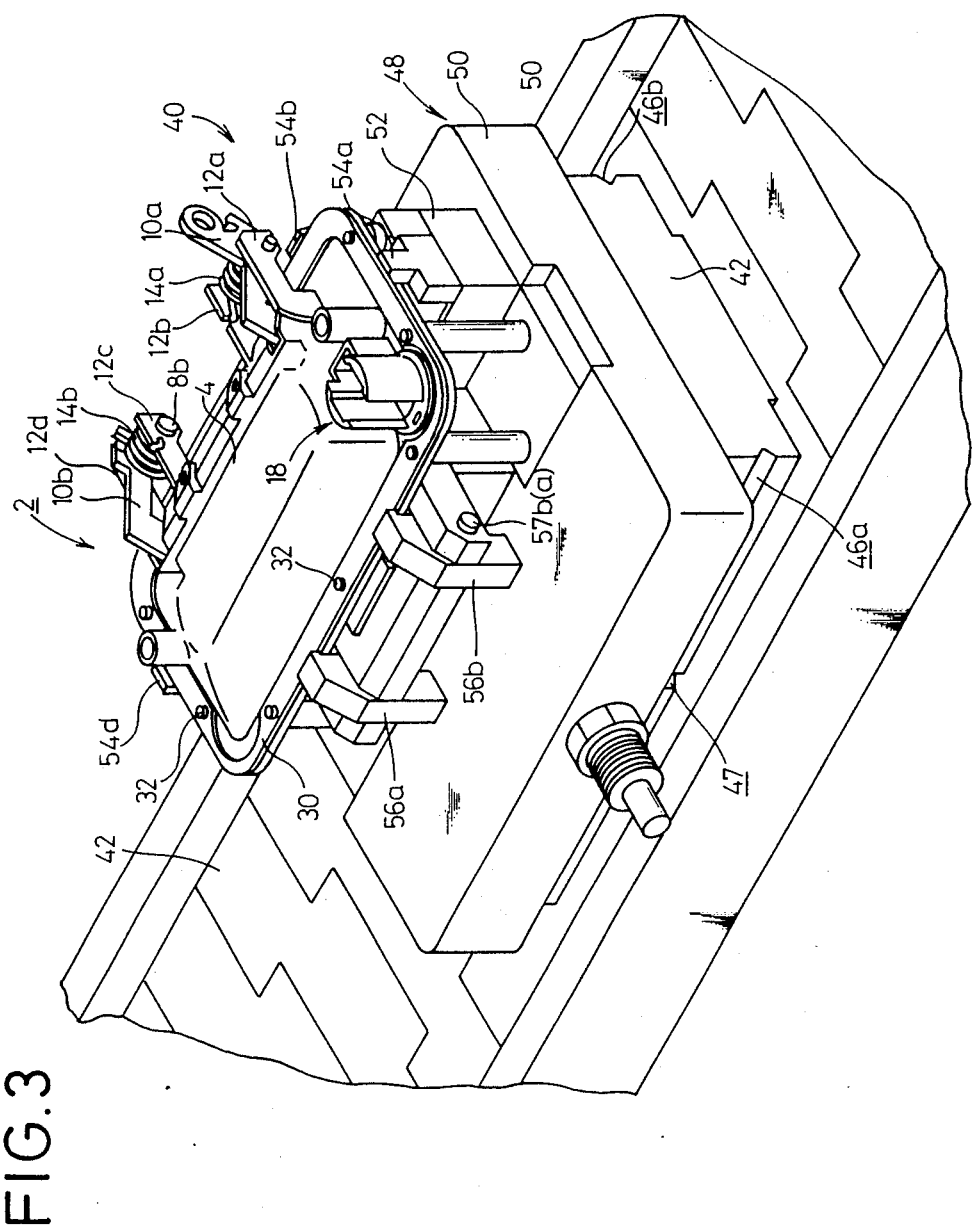
FIG. 3 is a perspective view of a pallet used for feeding the door handle.
Figure 4:
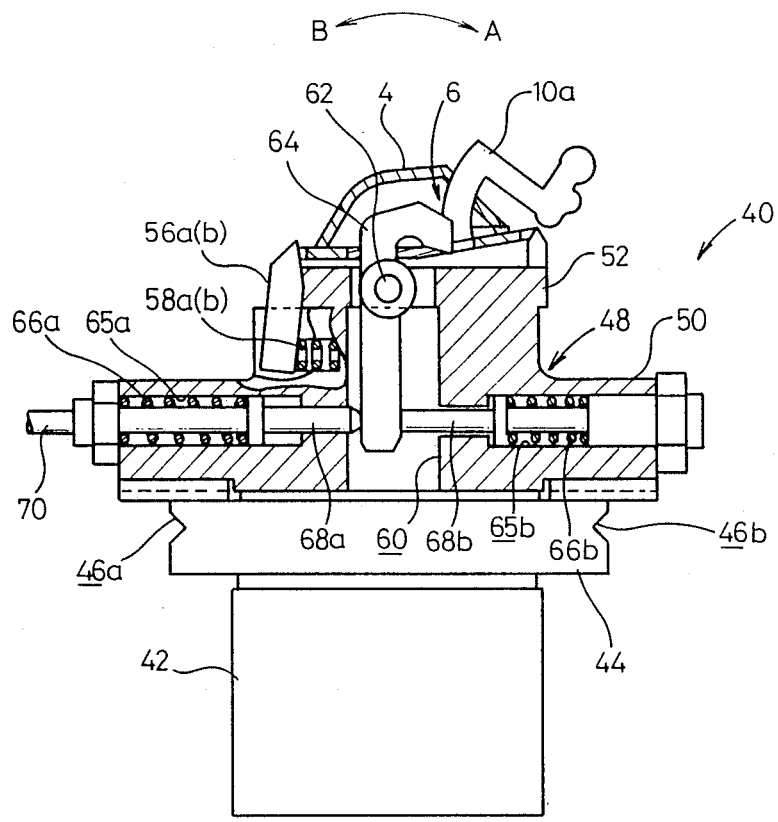
FIG. 4 is a cross-sectional view of the pallet.

FIG. 3 shows in perspective a handle case 4 and a handle 6 clamped as workpieces on a pallet 40. FIG. 4 illustrates a clamping mechanism mounted on the pallet 40 for fixing the handle 6 to the pallet 40. The pallet 40 is placed on a conveyor 42 which runs as a loop through all assembling steps at respective assembling stations (not shown), so that the pallet 40 can be delivered successively from one assembling station to another assembling station.

As shown in FIGS. 3 and 4, the pallet 40 includes a pallet base 44 having a pair of horizontal notches 46a, 46b defined in opposite sides thereof for receiving dog chucks (not shown) disposed in each of the assembling stations alongside of the conveyor 42 to stop the pallet 40 in position at each assembling position. One of the sides of the pallet base 44 has a vertical notch 47 defined therein across the horizontal notch 46a, for example. The pallet 40 can be positioned more accurately in each assembling station by engaging another dog chuck in the vertical notch 47.

A jig body 48 is fixedly mounted on the upper surface of the pallet base 44. The jig body 48 includes a first block 50 in the shape of a rectangular parallelepiped and a second block 52 disposed substantially centrally on the upper surface of the first block 50. Positioning members 54a through 54d are mounted on the upper surface of the second block 52 for engaging peripheral edges of the handle case 4 to position the handle case 4 against unwanted displacement. Two clamping members 56a, 56b for clamping the handle case 4 are disposed on one side of the second block 52. The clamping members 56a, 56b are angularly movably attached to the second block 52 by means of respective pins 57a, 57b. Compression coil springs 58a, 58b housed in the second block 52 engage the lower ends of the clamping members 56a, 56b, respectively, for normally urging the clamping members 56a, 56b resiliently to turn in a direction to cause upper fingers thereof to hold the handle case 4 down against the second block 52 (see FIG. 4).

As illustrated in FIG. 4, a vertically extending hole 60 is defined through the first and second blocks 50, 52, and a clamp lever 64 is disposed in the hole 60 and swingably supported by a pin 62. The first block 50 has a pair of horizontal holes 65a, 65b defined therein and communicating with the vertical hole 60, the holes 65a, 65b extending from the opposite sides of the first block 50 toward each other. Push rods 68a, 68b are disposed respectively in the holes 65a, 65b and have respective distal ends engaging the lower end of the clamp lever 64 in confronting relation under the resiliency of respective coil springs 66a, 66b disposed in the holes 65a, 65b around the push rods 68a, 78b. The coil spring 66b produces larger resilient forces than the coil spring 66a, so that the push rod 68b turns the clamp lever 64 about the pin 62 in the direction of the arrow A at all times against the bias of the coil spring 66a. Therefore, the handle 6 is held in position by a bent upper distal end of the clamp lever 64. A clamp release rod 70 engages the outer end of the push rod 68a. By bushing the clamp release rod 70, the clamp lever 74 is turned about the pin 62 in the direction of the arrow B to unclamp the handle 6.

The door handle assembling apparatus of the invention will be described below. The door handle assembling apparatus operates to install a key guard assembly 20 in a handle case 4.

Figure 5:
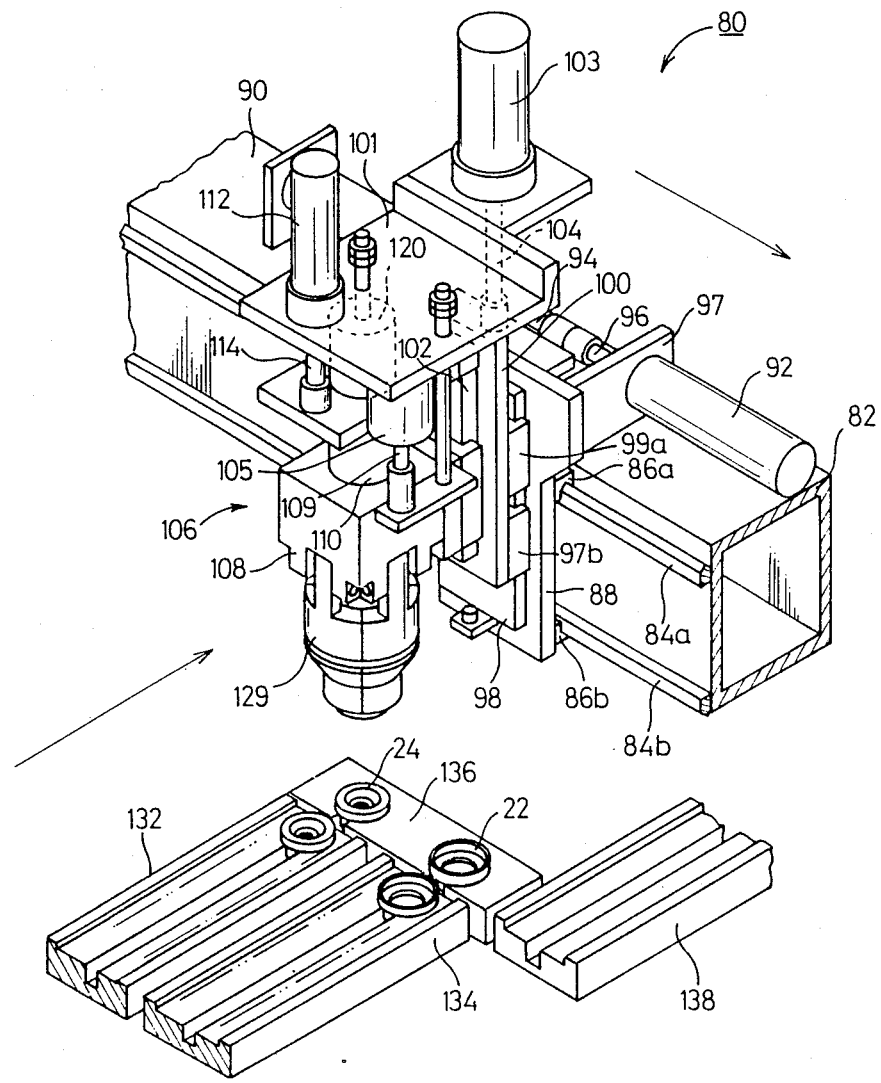
FIG. 5 is a perspective view of a device for superposing key guard assembly components in the door handle assembling apparatus.

FIG. 5 shows a superposing means in the door handle assembling apparatus for superposing key guard assembly components, i.e., a gasket 22 and a gasket cap 24 into a key guard assembly 20.

As shown in FIG. 5, a device 80 for superposing the key guard assembly components includes a horizontal beam 82 extending from a base (not shown) and supporting a pair of parallel rails 84a, 84b extending horizontally along the beam 82. Sliders 86a, 86b slidably mounted respectively on the rails 84a, 84b are integrally attached to a first support plate 88. Confronting cylinders 90, 92 are disposed on the beam 82, the cylinder 90 being fixed to the beam 82. The cylinder 90 has a piston rod 94 coupled to the piston rod 96 of the cylinder 92 which is integrally secured to the first support plate 88 by a bracket 97. Therefore, the various structural components and a superposing mechanism (described later) are horizontally displaceable along the beam 82 by the cylinders 90, 92 while being guided by the rails 84a, 84b.

To the first support plate 88, there is fixed a guide plate 98 over which sliders 99a, 99b integral with a second support plate 100 are slidably fitted. A superposing mechanism 106 (described later) is disposed on the second support plate 100. An attachment plate 101 is affixed to the upper end of the second support plate 100. A cylinder 103 mounted on the attachment plate 101 has a piston rod 104 secured to the first support plate 88. Therefore, the second support plate 100 and the superposing mechanism 106 are vertically displaceable with respect to the first support plate 88 in response to operation of the cylinder 103. The superposing mechanism 106 has a body 108 slidably engaging a guide plate 102 mounted on the second support plate 100.

Figure 6:
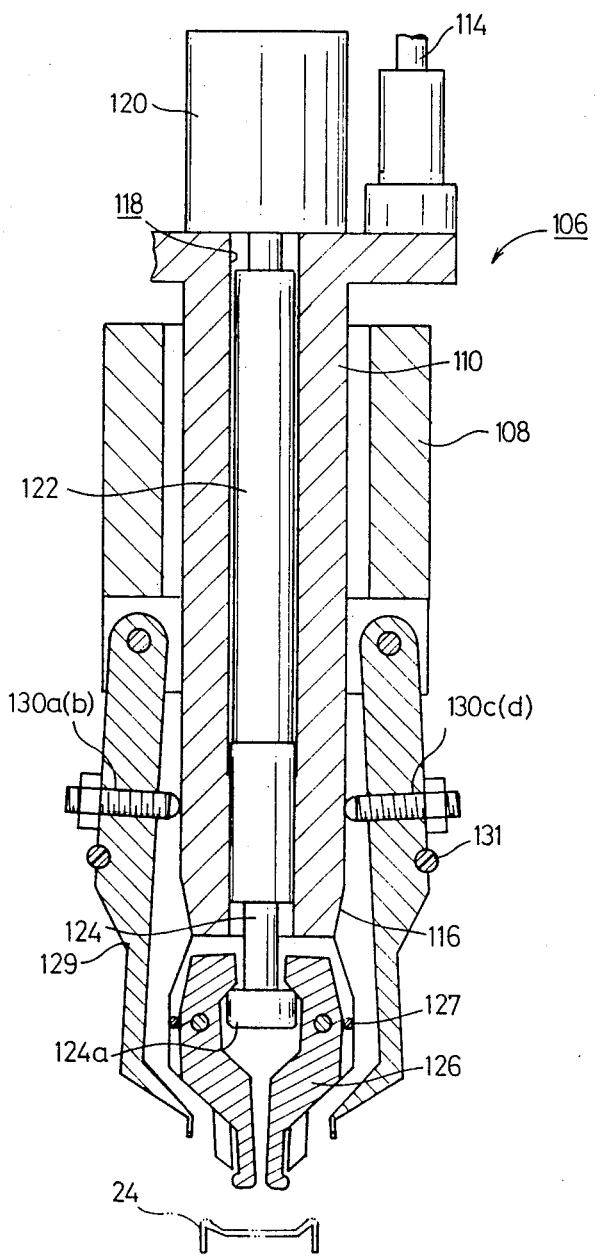
FIGS. 6 through 8 are cross-sectional views showing an operation sequence of a superposing mechanism in the superposing device.
Figure 7:
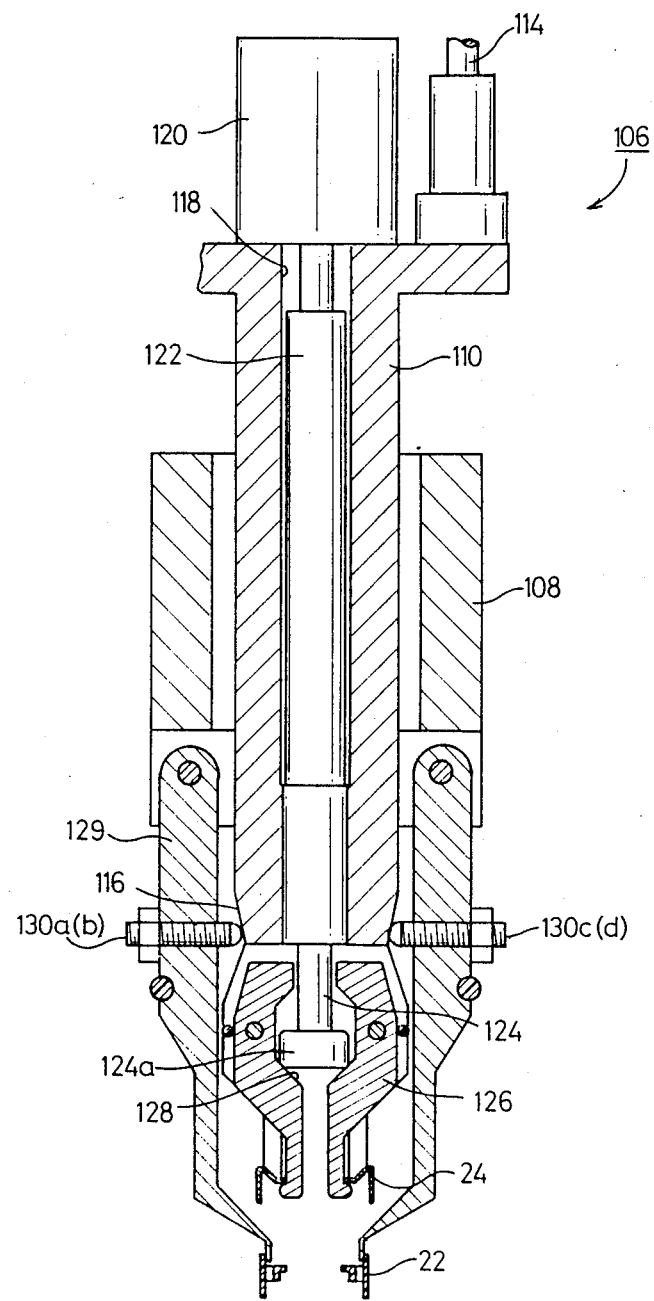
Figure 8:
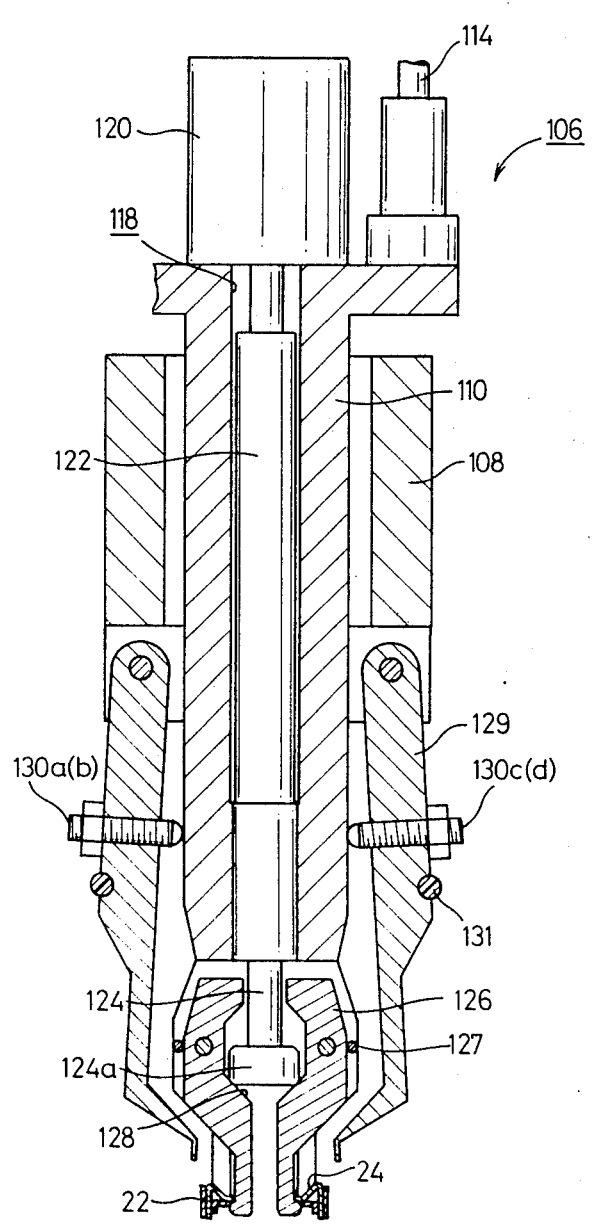

FIGS. 6 through 8 show the superposing mechanism 106 in detail. The superposing mechanism 106 includes the body 108, and the piston rod 109 of a first cylinder 105 (FIG. 5) fixed to the attachment plate 101 is coupled to the body 108. A cylindrical member 110 is loosely fitted in the body 108 and has an upper end connected to the piston rod 114 of a second cylinder 112 mounted on the attachment plate 101. The cylindrical member 110 has on its lower portion a tapered surface 116 which is progressively narrower in diameter in the downward direction. The cylindrical member 110 has a hole 118 defined coaxially therethrough. A rod 122 connected to a third cylinder 120 mounted on the cylindrical member 110 is provided for opening and closing a collet chuck. The rod 122 is inserted through the hole 118. The rod 122 includes a lower distal end on which a collet widening member 124 with a larger-diameter portion 124a on its lower distal end is coaxially mounted.

A first collet chuck 126 is mounted on the lower end of the cylindrical member 110. A resilient ring 127 is disposed around the first collet chuck 126 for resiliently contracting the first collet chuck 126 radially inwardly. The first collet chuck 126 has an inner tapered surface 128 which is engageable by the larger-diameter portion 124a of the collect widening member 124. When the larger-diameter portion 124a of the collet widening member 124 is downwardly displaced on and along the tapered surface 128 (FIG. 7), the first collet chuck 126 is spread or opened radially outwardly against the resiliency of the resilient ring 127. The outside diameter of the lower distal end of the first collet chuck 126 is slightly smaller than the inside diameter of the gasket cap 24 of the key guard assembly 20.

A second collet chuck 129 is mounted on the lower end of the body 108 concentrically with the first collet chuck 126 in surrounding relation thereto. Cam rods 130a through 130d are threaded in a central portion of the second collet chuck 129 and have distal ends engaging the tapered surface 116 of the cylindrical member 110. Upon relative displacement of the cylindrical member 110 and the body 108, the cam rods 130a through 130d are brought into engagement with an outer circumferential surface of the cylindrical member 110 which is larger in diameter than the tapered surface 116 to open or spread the second collet chuck 129. A resilient O-ring 131 is disposed around the second collet chuck 129 for normally contracting the same radially inwardly.

As illustrated in FIG. 5, first feed passages 132, 134 are disposed below the key guard superposing device 80 for supplying a gasket 22 and a gasket cap 24 from a parts feeder (not shown) to the key guard superposing device 80. The first feed passages 132, 134 are vibrated by a vibrator (not shown) to deliver gaskets 22 and gasket caps 24 slowly in the direction of the arrow. A workpiece table 138 which is vertically movable by a lifting and lower means (not shown) such as a cylinder therebelow is positioned at the ends of the first feed passages 132, 134 for receiving thereon a gasket 22 and a gasket cap 24. A second feed passage 138 is disposed adjacent to the workpiece table 136 for feeding a completed key guard assembly 20 to a next process. The second feed passage 138 is identical in construction to the first feed passages 132, 134 and extends to a position near a handling robot (FIG. 9) which will be described below.

Figure 9:
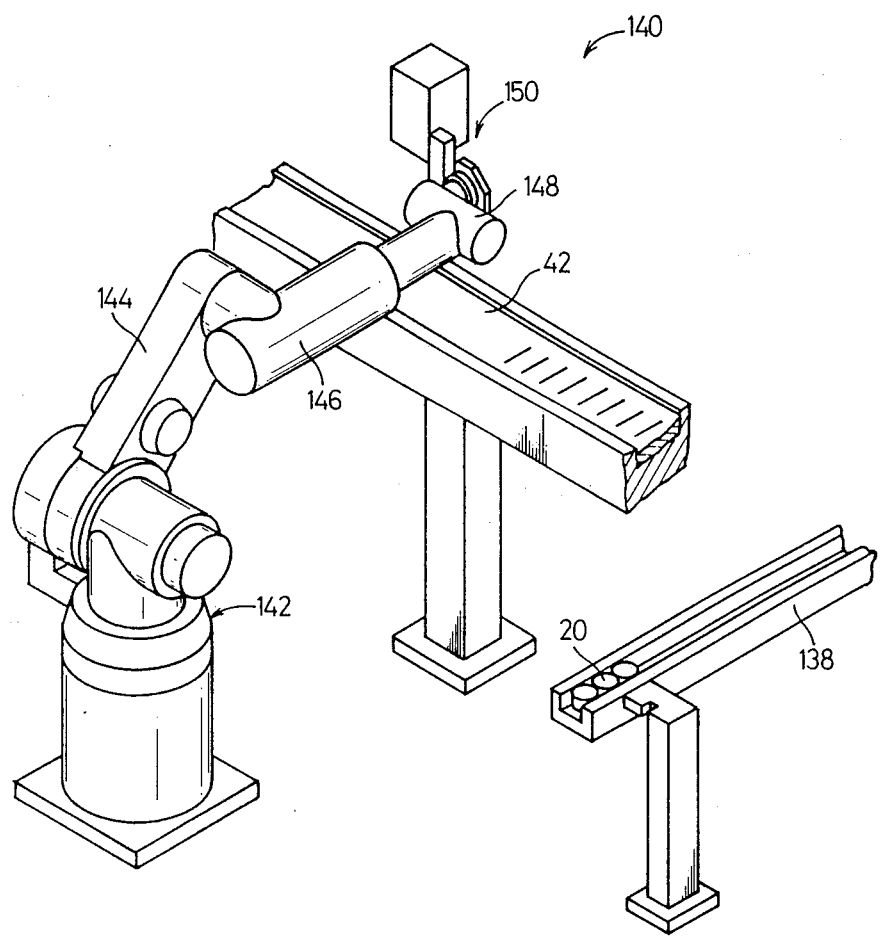
FIG. 9 is a perspective view of an industrial robot in the door handle assembling apparatus.

FIG. 9 shows a handling robot 140 for installing the key guard assembly 20.

While the handling robot 140 may be any of various industrial robots which are currently available for use in production sites, the handling robot 140 in the illustrated embodiment comprises a known industrial robot having six axes with the number of degrees of freedom being 6. The handling robot 140 comprises a swivel base 142, a first arm 144, a second arm 146, and a wrist 148 mounted on the distal end of the second arm 146. By teaching the wrist 148 through a desired path of movement, an end effector or hand mounted on the wrist 148 can be displaced along the desired path.

Figure 10:
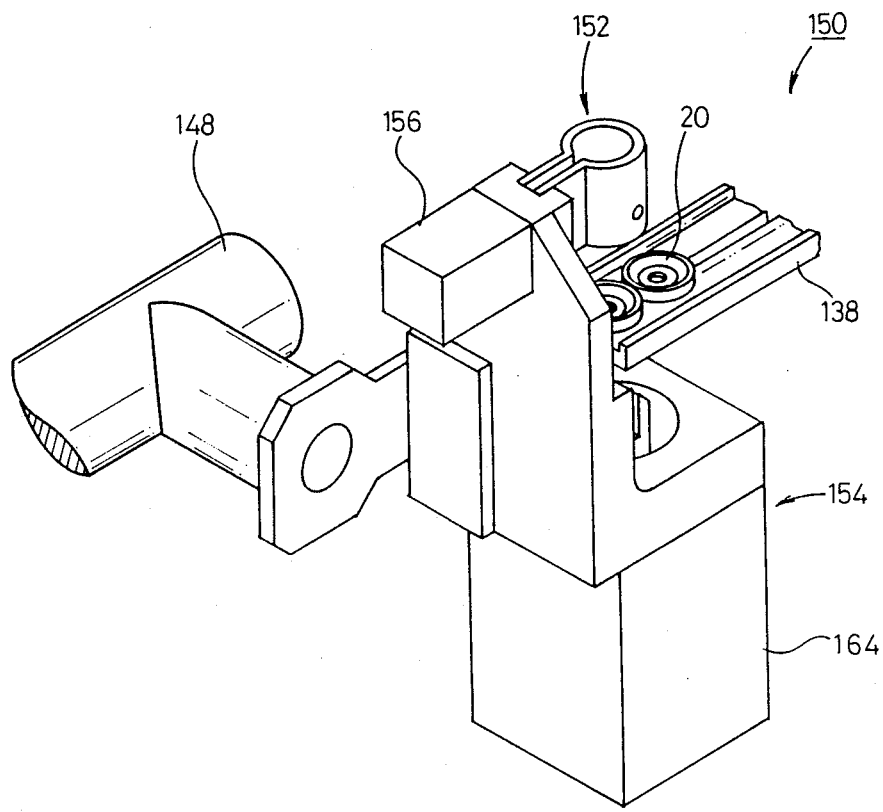
FIG. 10 is a perspective view of an end effector of the industrial robot illustrated in FIG. 9.
Figure 11:
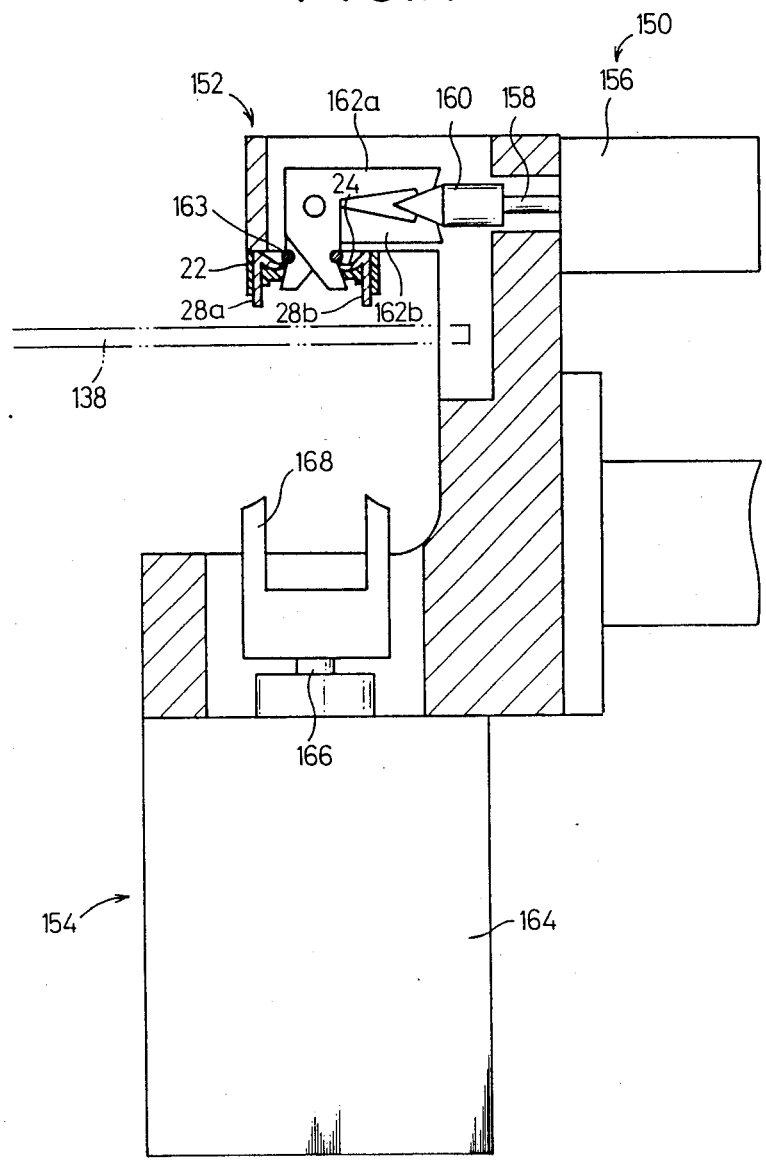
FIGS. 11 and 12 are cross-sectional views illustrating the manner in which the end effector operates.

FIG. 10 illustrates an end effector 150 mounted on the wrist 148 of the handling robot 140. The end effector 150 comprises a chuck means 152 for gripping and picking up a key guard assembly 20 which has been fed along the second feed passage 138, and a staking means 154 for inserting the key guard assembly 20 into a handle case 4 and staking the key guard assembly 20 fixedly on the handle case 4. FIG. 11 cross-sectionally shows the end effector 150 in detail.

The chuck means 152 includes a cylinder 156 as an opening/closing drive source having a piston rod 158 on which there is mounted a pusher member 160 that is tapered toward its distal end. The pusher member 160 is disposed near rear ends of holder levers 162a, 162b which are openably and closably coupled to each other, for opening the other distal ends of the holder levers 162a, 162b by being inserted between the rear ends of the holder levers 162a, 162b. A resilient member 163 is disposed around the distal ends of the holder levers 162a, 162b for normally urging them in a closing direction. The staking means 154 which is disposed in confronting relation to the chuck means 152 has a drive source 164 comprising a cylinder and a staking tool 168 mounted on the distal end of the piston rod 166 of the cylinder 164 for bending the tongues 28a, 28b of a gasket cap 24 to fix the key guard assembly 20 to the handle case 4.

The door handle assembling apparatus of the invention is basically constructed as described above. Operation and advantages of the door handle assembling apparatus will be described below.

A handle case 4 and a handle 6 which are substantially assembled on a pallet 40 are fed into an assembling station in which a key guard assembly 20 will be installed in a door handle assembly 2 by devices of the door handle assembling apparatus of the invention. More specifically, the handle case 4 is fixed in position by being engaged by the fingers on the distal ends of the clamping members 56a, 56b biased by the springs 58a, 58b, and the handle 6 is secured by the clamp lever 64 (see FIG. 4). The push rod 68b engaging the lower end of the clamp lever 64 applies a torque tending to turn the clamp lever 64 in the direction of the arrow A against the resiliency of the coil spring 66a which biases the push rod 68a, so that the handle 6 is firmly held in position by the clamp lever 64.

When the pallet 40 reaches a prescribed position in the assembling station, the dog chucks of a pallet positioning means (not shown) disposed alongside of the conveyor 42 engage in the notches 46a, 46b, 47 in the sides of the pallet base 44, thus stopping the pallet 44. Then, the key guard assembly 20 is installed in the handle case 4 fixedly mounted on the pallet 40.

Key guard assembly components are superposed by the key guard superposing device 80 shown in FIG. 5, and key guard assemblies 20 are successively fed on and along the second feed passage 138. Operation of the key guard superposing device 80 will be described below.

In FIG. 5, gaskets 22 and gasket caps 24 are fed respectively on and along the first feed passages 132, 134 to the workpiece table 136. When one gasket 22 and one gasket cap 24 reach the workpiece table 136, the workpiece table 196 is elevated to a predetermined working position by a cylinder (not shown). At this time, the superposing mechanism 106 of the key guard superposing device 80 is positioned directly above the gasket cap 24 on the workpiece table 136.

The second cylinder 103 of the key guard superposing device 80 is then operated to extend its piston rod 104. As shown in FIG. 6, the first collet chuck 126 mounted on the lower distal end of the cylindrical member 110 coupled to the piston rod 114 now projects out of the second collet 129. At this time, the cylindrical member 110 is lowered relatively to the body 108, so that the cam rods 130a through 130d are relatively moved from the tapered portion 116 onto the larger-diameter outer circumferential surface of the cylindrical member 110. Consequently, the second coet chuck 129 is opened to allow the first collet chuck 126 to project out of the second collet chuck 129.

Then, the cylinder 103 is actuated to retract the piston rod 104 thereof in FIG. 5. As a result, the second support plate 100 coupled to the cylinder 103 through the attachment plate 101 is lowered while being guided by the guide plate 98. The superposing mechanism 106 mounted on the second support plate 100 is therefore caused to descend for receiving the gasket cap 24 placed on the workpiece table 136.

After the lower end of the first collet chuck 126 has been positioned in the gasket cap 24, the rod 122 extending from the third cylinder 120 is lowered to cause the larger-diameter portion 124a of the collet widening member 124 to slide on and along the inner tapered surface 128 of the first collet chuck 126 to open or spread the first collet chuck 126. As a consequence, the gasket cap 24 is held by the first collet chuck 126. The gasket cap 24 is subsequently continuously retained by the first collet chuck 126.

With the gasket cap 24 held by the first collet chuck 126, the piston rod 114 of the second cylinder 112 is retracted to elevate the cylindrical member 110, and at the same time the piston rod 109 of the first cylinder 105 is extended to lower the body 108 coupled to the piston rod 109, thereby drawing the first collet chuck 126 into the second collet chuck 129 (FIG. 7). The piston rod 104 of the cylinder 103 is extended to lift the superposing mechanism 106 in its entirety. Then, the superposing mechanism 106 is displaced laterally along the beam 82 in the direction of the arrow. More specifically, the piston rod 94 of the cylinder 90 is extended and the piston rod 96 of the cylinder 92 which confronts the cylinder 90 is retracted. The superposing mechanism 106 is now moved along the beam 82 into a position directly above the gasket 22 on the workpiece table 136, while being guided along the rails 84a, 84b.

When the superposing mechanism 106 arrives at the position above the gasket 22, it is stopped and then displaced downwardly by the cylinder 103. The cylinder 103 is shut off when the lower distal end of the second collet chuck 126 on the lower end of the body 108 is positioned within the gasket 22. Thereafter, the piston rod 114 of the second cylinder 112 is extended to cause the cam rods 130a through 130d to slide on and along the tapered surface 116 of the cylindrical member 110 to open or spread the second collet chuck 129. The gasket 22 is now securely held and simultaneously spread slightly radially outwardly (see FIG. 7). Continued extension of the piston rod 114 brings the first collect chuck 126 out of the second collet chuck 129 to position the gasket cap 24 held by the first collet chuck 126 in superposing relation to the gasket 22. The first cylinder 105 is operated to elevate the body 108 with respect to the cylindrical member 110, whereupon the second collet chuck 129 is released from the gasket 22 (see FIG. 8). In this manner, the gasket 22 and the gasket cap 24 can reliably be superposed with respect to each other by relatively displacing the first and second collet chucks 126, 129 which are vertically displaceably and concentrically arranged.

Subsequently, the superposing mechanism 106 is caused to ascend by the cylinder 103 and moved laterally along the beam 82 in the direction of the arrow to deliver the key guard assembly 20 held by the first collet chuck 126 to the position directly above the second feed passage 138. The superposing mechanism 106 is thereafter moved downwardly, and the rod 122 coupled to the third cylinder 120 is elevated to displace the larger-diameter portion 124a of the collet widening member 124 out of engagement with the tapered surface 128 of the first collet chuck 126. The first collet chuck 12 is contracted radially inwardly under the resiliency of the resilient ring 127 to release the key guard assembly 20, which then drops onto the second feed passage 138.

The key guard assembly 20 is supplied along the second feed passage 138 to a position near the handling robot 140 (FIG. 9). The handling robot 140 picks up one, at a time, of supplied key guard assemblies 20 from the end of the second feed passage 138, and sets the picked-up key guard assembly 20 on the workpieces on the pallet 40.

As shown in FIG. 11, the end effector 150 on the wrist 148 of the handling robot 140 holds a key guard assembly 20 as follows: The end effector 150 is lowered as a whole to move the chuck means 152 toward the key guard assembly 20 positioned on the end of the second feed passage 138. When the lower distal ends of the holder levers 162, 162b of the chuck means 152 are inserted in the key guard assembly 20, the cylinder 156 is actuated to force the pusher member 160 to spread apart the holder levers 162a, 162b, thus firmly holding the key guard assembly 20. Then, the handling robot 140 operates to set the key guard assembly 20 on the handle case 4 on the pallet 40.

Figure 12:
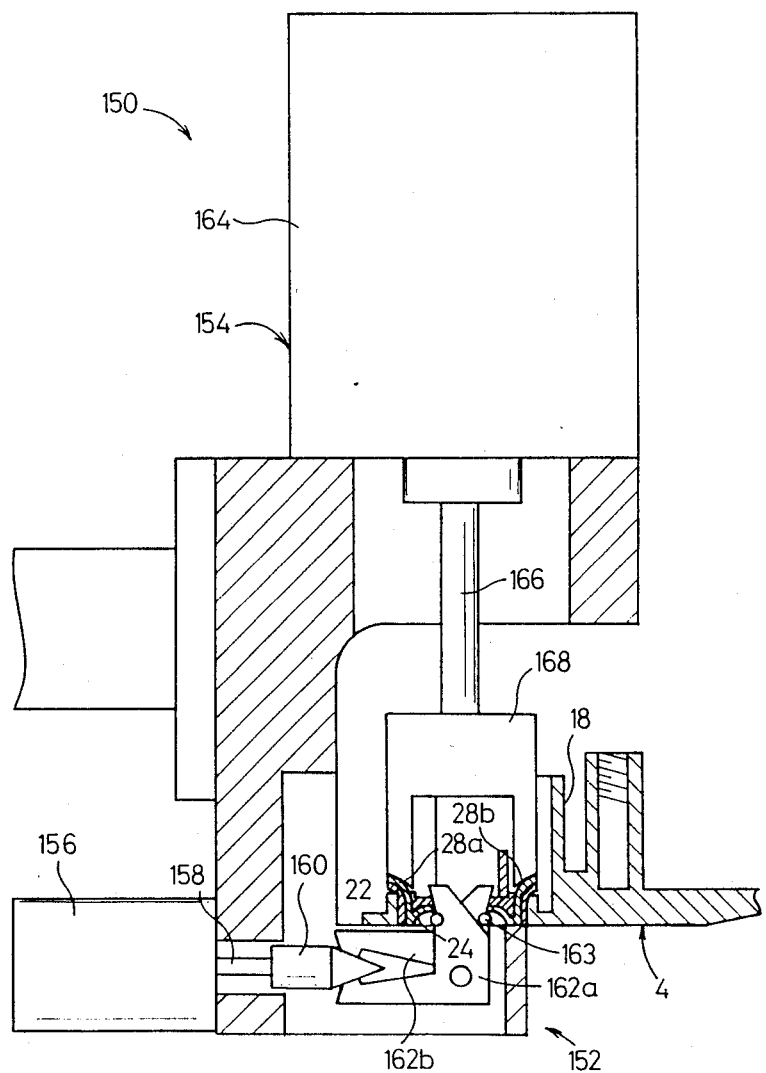

As shown in FIG. 12, the handling robot 140 inserts the key guard assembly 20 upwardly into the handle case 4 on the pallet 40. When the key guard assembly 20 is set in the protective member 18 of the handle case 4, the piston rod 158 is retracted to release the holder levers 162a, 162b from the key guard assembly 20. The cylinder 164 of the staking means 154 is then activated to extend the piston rod 166 to cause the staking tool 168 on the piston rod 166 to bend over the tongues 28a, 28b of the gasket cap 24, whereupon the key guard assembly 20 is fixed to the handle case 4. The chuck means 152 and the staking means 154 which are positioned in confronting relation to each other allow the key guard assembly 20 to be inserted and then staked successively.

The above operation of the handling robot 160 is repeated to install key guard assemblies 20 successively supplied from the second feed passage 138 on respective handle cases 4.

With the present invention, as described above, the processes of superposing key guard assembly components and installing completed key guard assemblies, which have heretofore been manually effected, are fully automatized. Therefore, the workers are relieved from a monotonous assembling operation. The automatized assembling process is advantageous in that its processing capability in unit time is much higher than that of a manual assembling process and the cost of production is greatly reduced.

Although a certain preferred embodiment has been shown and described, it should be understood that many changes and modifications may be made therein without departing from the scope of the appended claims.

What is claimed is:

1. An apparatus for assembling a door handle by installing a key guard assembly in the door handle in automatically assembling the door handle assembly to be mounted on the outer surface of an automotive door panel, said apparatus comprising:

first feed means for feeding components of the key guard assembly supplied from a parts feeder;

superposing means for superposing the components of the key guard assembly supplied by said first feed means, into a key guard assembly;

an industrial robot for installing the key guard assembly in a door handle and;

second feed means for delivering the key guard assembly to said industrial robot;

said industrial robot comprising chuck means for gripping said key guard assembly and installing the key guard assembly in the door handle, and an end effector having staking means for bending tongues of said key guard assembly to fix the key guard assembly to the door handle.

2. An apparatus according to claim 1, wherein said superposing means includes horizontal beam supporting rails, a first support member movably engaging said rails and horizontally movable along said rails by a cylinder, a second support member vertically movably engaging said first support member and movable by a cylinder, and a superposing mechanism disposed on said second member for holding first and second components of the key guard assembly in concentric relation to each other and for assembling said first and second components together.

3. An apparatus according to claim 1, wherein said industrial robot further includes an end effector, said chuck means and said staking means being disposed on said end effector in confronting relation to each other.

4. An apparatus according to claim 3, wherein said staking means includes a cylinder having a piston rod, and a staking tool mounted on a distal end of said piston rod for bending tongues of the key guard assembly.

5. An apparatus for assembling a door handle by installing a key guard assembly in the door handle in automatically assembling the door handle assembly to be mounted on an automotive door panel, said apparatus comprising:

first feed means for feeding components of the key guard assembly supplied from a parts feeder;

superposing means for superposing the components of the key guard assembly supplied by said first feed means, into a key guard assembly;

an industrial robot for installing the key guard assembly in a door handle;

second feed means for delivering the key guard assembly to said industrial robot;

said industrial robot comprising chuck means for gripping said key guard assembly and installing the key guard assembly in the door handle, and an end effector having staking means for bending tongues of said key guard assembly to fix the key guard assembly to the door handle;

said superposing means includes horizontal beam supporting rails, a first support member movably engaging said rails and horizontally movable along said rails by a cylinder, a second support member vertically movably engaging said first support member and movable by a cylinder; and a superposing mechanism disposed on said second support member for holding first and second components of the key guard assembly in concentric relation to each other and for assembling said first and second components together;

said superposing mechanism comprises a body vertically movably engaging said second support member, a cylindrical member loosely fitted in said body, a first collet chuck mounted on a lower end of said cylindrical member, and a second collet chuck mounted on a lower end of said body in concentrically surround relation to said first collet chuck, said first collet chuck while holding the first component being retractable into said second collet chuck, said second component being held by said second collet chuck, and thereafter said first collet chuck is protected from said second collet chuck to superpose said first component on said second component held by said second collet chuck.

6. An apparatus according to claim 5, further including a first cylinder coupled to said body for vertically moving said body, a second cylinder coupled to said cylindrical member for axially moving said cylindrical relatively to said body, and a cam rod mounted on said second collet chuck and slidable along an outer tapered surface of said cylindrical member to open and close said second collet chuck when said cylindrical member and said body are relatively moved in response to operation of said first and second cylinders.

7. An apparatus according to claim 5 or 3, further including a third cylinder having a rod extending therefrom and inserted coaxially through said cylindrical member, and a widening member connected to a distal end of said rod of the third cylinder and slidably engaging an inner tapered surface of said first collet chuck for opening and closing said first collet chuck.

8. An apparatus for assembling a door handle by installing a key guard assembly in the door handle in automatically assembling the door handle assembly to be mounted on the outer surface of an automotive door panel, said apparatus comprising:

first feed means for feeding components of the key guard assembly supplied from a parts feeder;

superposing means for superposing the components of the key guard assembly supplied by said first feed means, into a key guard assembly;

an industrial robot for installing the key guard assembly in a door handle;

second feed means for delivering the key guard assembly to said industrial robot;

said industrial robot comprising chuck means for gripping said key guard assembly and installing the key guard assembly in the door handle, and an end effector having staking means for bending tongues of said key guard assembly to fix the key guard assembly to the door handle;

said industrial robot further includes an end effector, said chuck means and said staking means being disposed on said end effector in confronting relation to each other;

said chuck means comprises a pair of levers angularly movable toward and away from each other and normally urged to move toward each other by a resilient member, a cylinder having a piston rod, and a pusher member mounted on said piston rod and having a tapered distal end portion, when said cylinder is actuated, said pusher member may be inserted between rear ends of said levers to turn said levers away from each other for holding the key guard assembly.

9. An apparatus according to claim 8, wherein said staking means includes a cylinder having a piston rod, and a staking tool mounted on a distal end of said piston rod for bending tongues of the key guard assembly.

* * * * *